US012571942B2

(12) United States Patent
Sato et al.

(10) Patent No.: US 12,571,942 B2
(45) Date of Patent: Mar. 10, 2026

(54) FRESNEL LENS AND IMAGE OBSERVING DEVICE

(71) Applicant: SONY INTERACTIVE ENTERTAINMENT INC., Tokyo (JP)

(72) Inventors: Fumihiko Sato, Tokyo (JP); Manabu Ishioka, Tokyo (JP); Hiroyuki Tatsubori, Aichi (JP); Rei Miyazaki, Chiba (JP); Shotaro Tada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 631 days.

(21) Appl. No.: 17/610,196

(22) PCT Filed: Jun. 3, 2020

(86) PCT No.: PCT/JP2020/021981
§ 371 (c)(1),
(2) Date: Nov. 10, 2021

(87) PCT Pub. No.: WO2020/246509
PCT Pub. Date: Dec. 10, 2020

(65) Prior Publication Data
US 2022/0221621 A1 Jul. 14, 2022

(30) Foreign Application Priority Data
Jun. 7, 2019 (JP) ................................. 2019-107348

(51) Int. Cl.
*G02B 3/08* (2006.01)
*G02B 27/01* (2006.01)
(52) U.S. Cl.
CPC ............ *G02B 3/08* (2013.01); *G02B 27/0172* (2013.01)

(58) Field of Classification Search
CPC . G02B 3/08; G02B 27/0172; G02B 2027/012
See application file for complete search history.

(56) References Cited

U.S. PATENT DOCUMENTS 5,914,760 A * 6/1999 Daiku .................. G02B 6/0053
349/95
6,407,860 B1 * 6/2002 Funazaki ................. G02B 3/08
359/743
(Continued)

FOREIGN PATENT DOCUMENTS

CN 104471306 A * 3/2015 ........... G02B 6/0016
EP 1006399 B1 * 4/2006 ............. G02B 26/02
(Continued)

OTHER PUBLICATIONS

International Search Report and Written Opinion mailed Aug. 11, 2020, from PCT/JP2020/021981, 13 sheets.
(Continued)

*Primary Examiner* — Sharrief I Broome
*Assistant Examiner* — K Muhammad
(74) *Attorney, Agent, or Firm* — Kilpatrick Townsend & Stockton LLP

(57) ABSTRACT

There is provided a Fresnel lens capable of restraining flare from occurring. Each of a plurality of prisms (11) of a Fresnel lens (10) has an effective surface (Es) and a noneffective surface (Ns). In each of the prisms (11), the noneffective surface (Ns) has a first noneffective surface (Ns1) and a second noneffective surface (Ns2) that is closer to a crest (11c) of the prism (11) than the first noneffective surface (Ns1). The first noneffective surface is inclined to an optical axis (Z1).

17 Claims, 8 Drawing Sheets

(56)        References Cited

U.S. PATENT DOCUMENTS

| | | | | |
|---|---|---|---|---|
| 2009/0067062 A1* | 3/2009 | Suzuki | .................... | G02B 3/08 |
| | | | | 359/742 |
| 2009/0244270 A1* | 10/2009 | Takagi | ................... | G02B 30/27 |
| | | | | 348/E13.001 |
| 2015/0226887 A1 | 8/2015 | Gombert et al. | | |
| 2019/0011611 A1* | 1/2019 | Kasazumi | ............. | B60K 35/00 |
| 2019/0250310 A1 | 8/2019 | Lin et al. | | |

FOREIGN PATENT DOCUMENTS

| | | | | |
|---|---|---|---|---|
| JP | S61-277935 A | | 12/1986 | |
| JP | H08-75906 A | | 3/1996 | |
| JP | 2000171613 A | | 6/2000 | |
| JP | 2002221605 A | * | 8/2002 | |
| JP | 2004-212770 A | | 7/2004 | |
| JP | 2009237112 A | | 10/2009 | |
| JP | 2010282032 A | * | 12/2010 | .............. F24S 23/31 |
| JP | 2013057874 A | * | 3/2013 | .............. G02B 3/08 |
| JP | 2013-68751 A | | 4/2013 | |
| JP | 2013068751 A | * | 4/2013 | |
| JP | 2014-119738 A | | 6/2014 | |
| JP | 2014-126713 A | | 7/2014 | |
| JP | 2017129753 A | * | 7/2017 | ............. B60K 35/00 |
| JP | 7506066 B2 | | 6/2024 | |
| WO | WO-2005059641 A1 | * | 6/2005 | .............. G02B 3/08 |
| WO | 2016/084752 A1 | | 6/2016 | |
| WO | 2017/138480 A1 | | 8/2017 | |
| WO | 2018/008249 A1 | | 1/2018 | |

OTHER PUBLICATIONS

Japanese Decision to Grant issued May 14, 2024, in corresponding Japanese Patent Application No. 2021-624880, 4pp.
JP2024-095969, "Office Action", Aug. 19, 2025, 11 pages.

* cited by examiner

F I G . 1
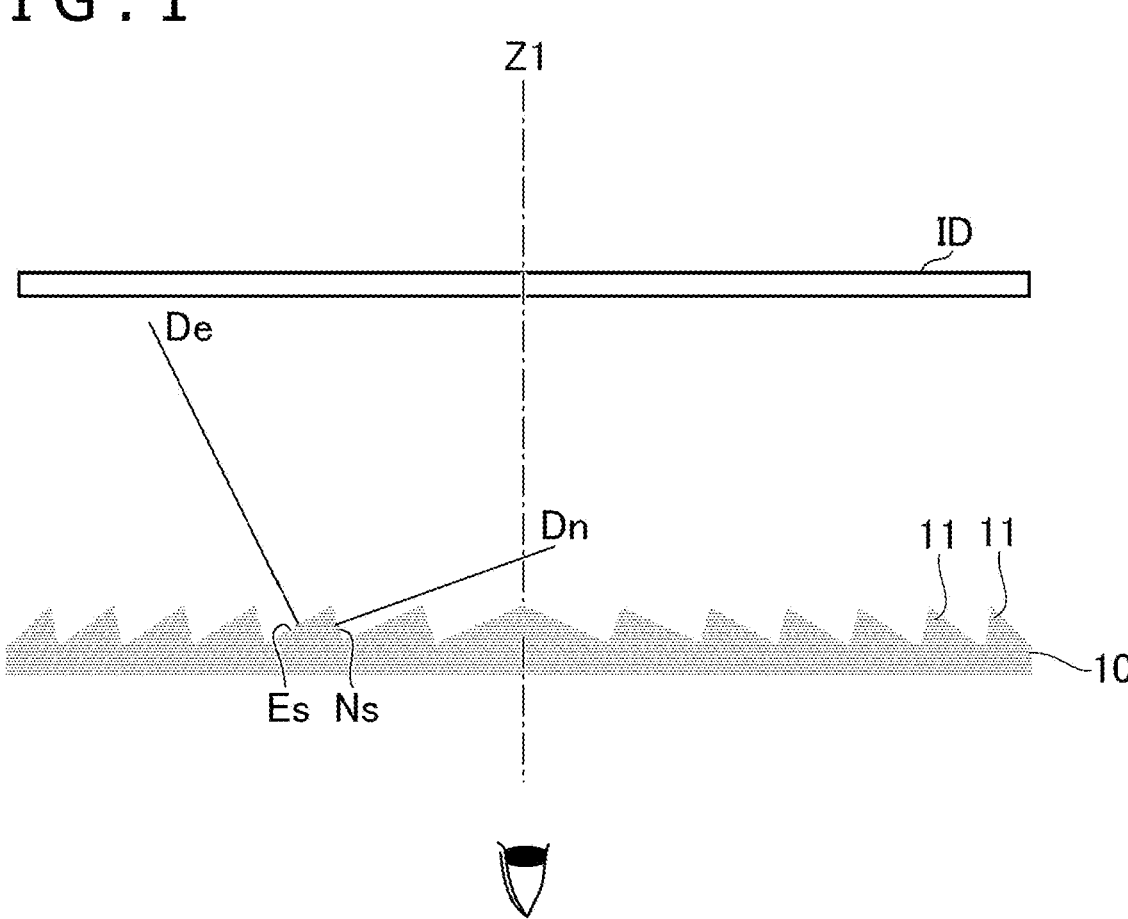

F I G . 3
(a)
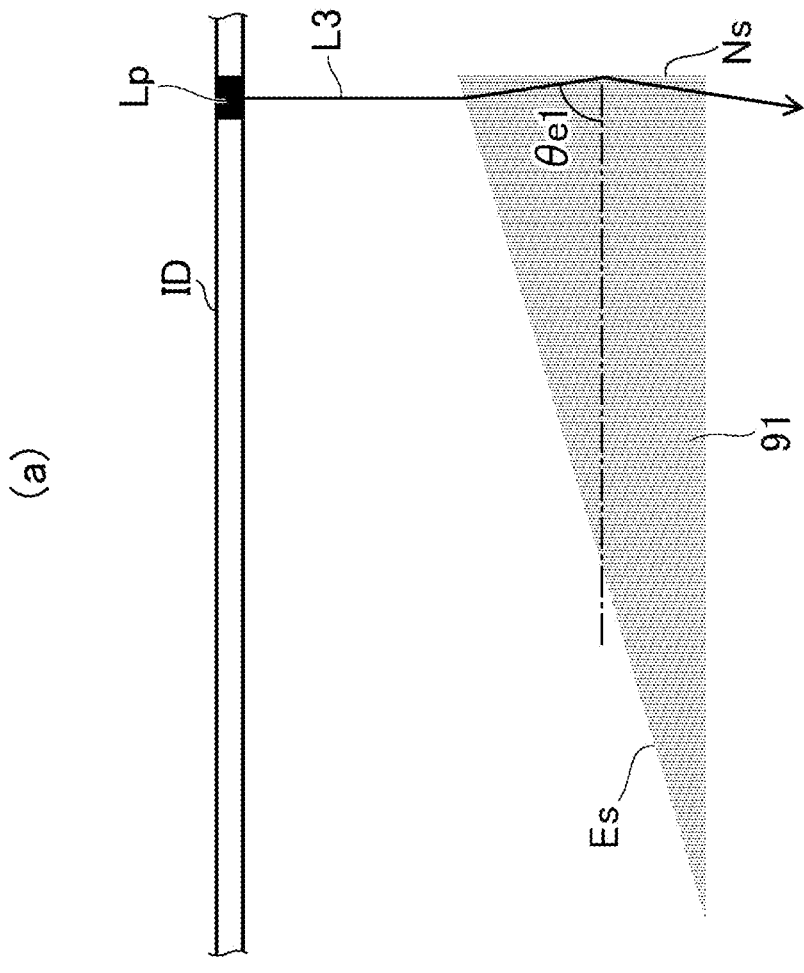
(b)
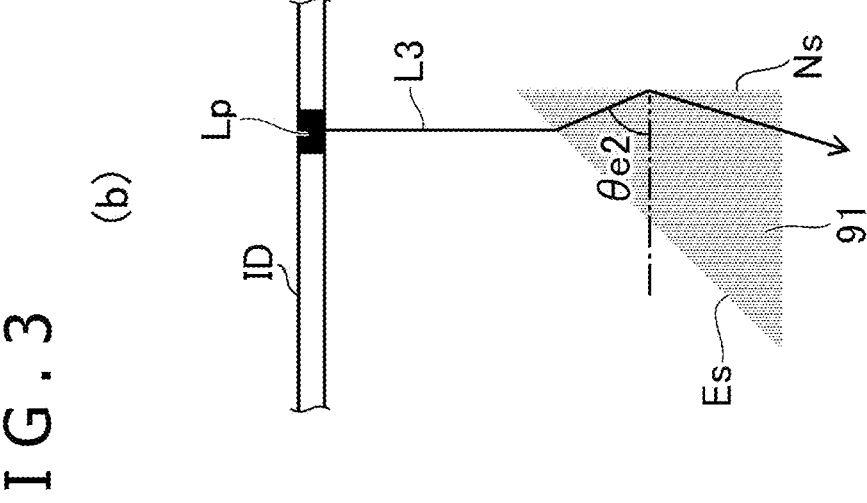

F I G . 5 A
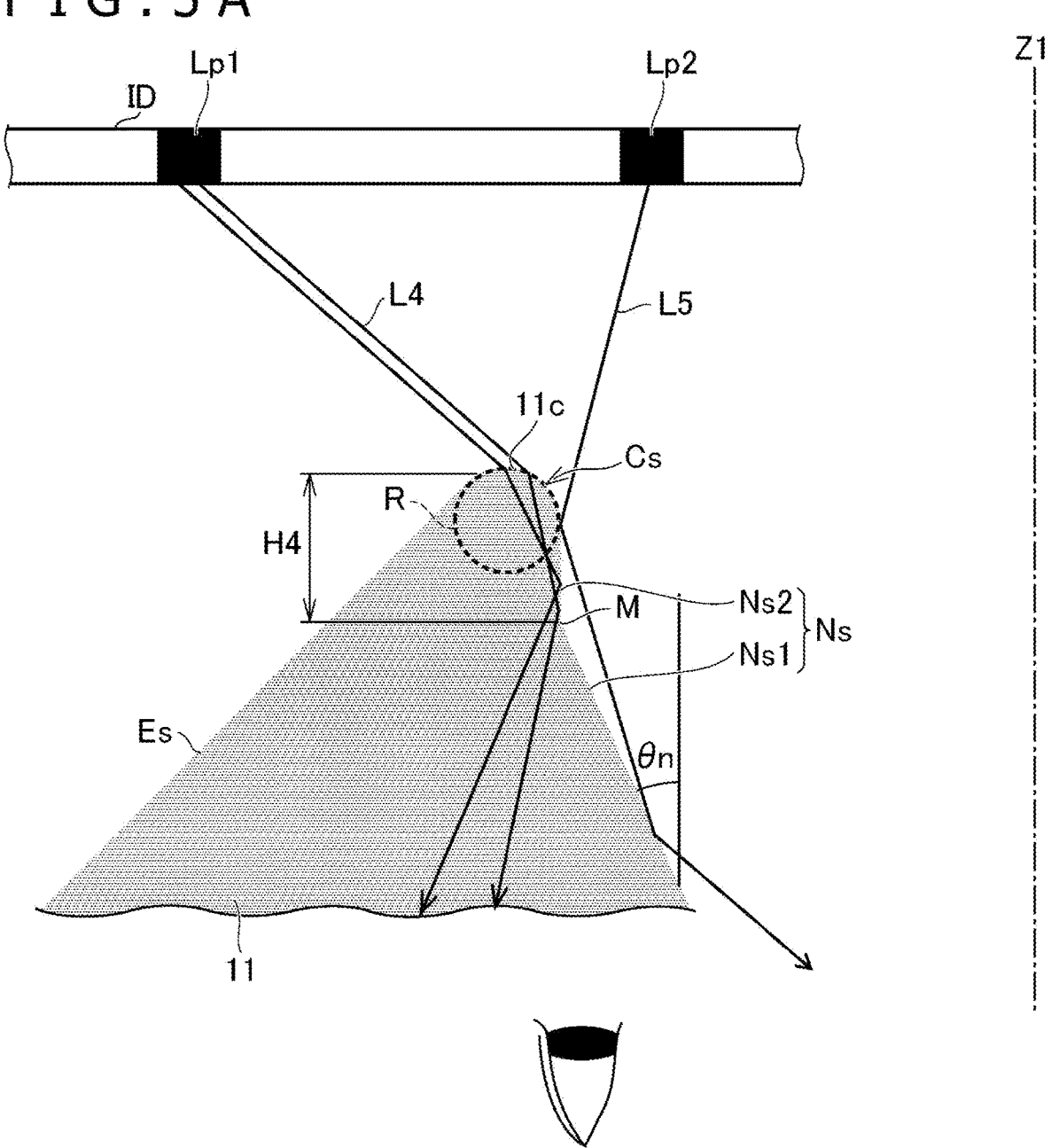

FRESNEL LENS AND IMAGE OBSERVING DEVICE

TECHNICAL FIELD

The present invention relates to a Fresnel lens and an image observing device.

BACKGROUND ART

Fresnel lenses are constructed of a plurality of prisms arrayed from an optical axis toward an outer circumference of the lens. PTL 1 referred to below discloses a Fresnel lens. Each of the prisms is of a substantially triangular cross-sectional shape and has an effective surface and a noneffective surface. The effective surfaces of the prisms face the outer circumference of the Fresnel lens and are inclined to the optical axis. The effective surfaces correspond to a plurality of divided annular sections of a lens surface of a convex lens having desired optical performance. The noneffective surfaces face the optical axis and lie parallel to the optical axis.

CITATION LIST

Patent Literature

[PTL 1]
WO2017/138480A1

SUMMARY

Technical Problem

In an image observing device that allows an observer to see a moving image through a Fresnel lens, light of the image reaches not only the effective surfaces of the prisms but also the noneffective surfaces thereof. The light is reflected by the noneffective surfaces and may land at the eyes of the observer. The light reflected by the noneffective surfaces and landing at the eyes of the observer is liable to produce flare. In other words, the light reflected by the noneffective surfaces causes the observer to see a spreading pattern of light around a light emission spot in the image.

Solution to Problem

An example of a Fresnel lens proposed in the present disclosure has a plurality of prisms arrayed from an optical axis toward an outer circumference of the lens. Each of the plurality of prisms has an effective surface facing the outer circumference of the Fresnel lens and inclined to the optical axis, a noneffective surface facing the optical axis, and a crest between the effective surface and the noneffective surface. The noneffective surface of at least one of the plurality of prisms has a first surface and a second surface that is closer to the crest of the prism than the first surface, at least the first surface being inclined to the optical axis. The Fresnel lens is capable of suppressing flare from occurring.

An example of an image observing device proposed in the present disclosure includes the Fresnel lens referred to above and a display device. The image observing device is capable of suppressing flare from occurring.

In the Fresnel lens, the noneffective surface may be bent at a boundary between the first surface and the second surface. Unlike such a structure, the noneffective surface may be curved in its entirety, and a portion thereof may function as the first surface and another portion thereof may function as the second surface. In the Fresnel lens, furthermore, both the first surface and the second surface may be inclined to the optical axis. In this case, angles of the first surface and the second surface with respect to the optical axis may be the same as each other.

BRIEF DESCRIPTION OF DRAWINGS

FIG. 1 is a schematic cross-sectional view of a Fresnel lens.

FIG. 3 is a view illustrative of a relation between a distance from an optical axis to a prism and an angle of a noneffective surface.

FIG. 5A is a cross-sectional view illustrating at an enlarged scale a crest of a prism having a second noneffective surface.

FIG. 6 is a view of a head-mounted display as an example of an image observing device.

DESCRIPTION OF EMBODIMENT

Figure 2A:
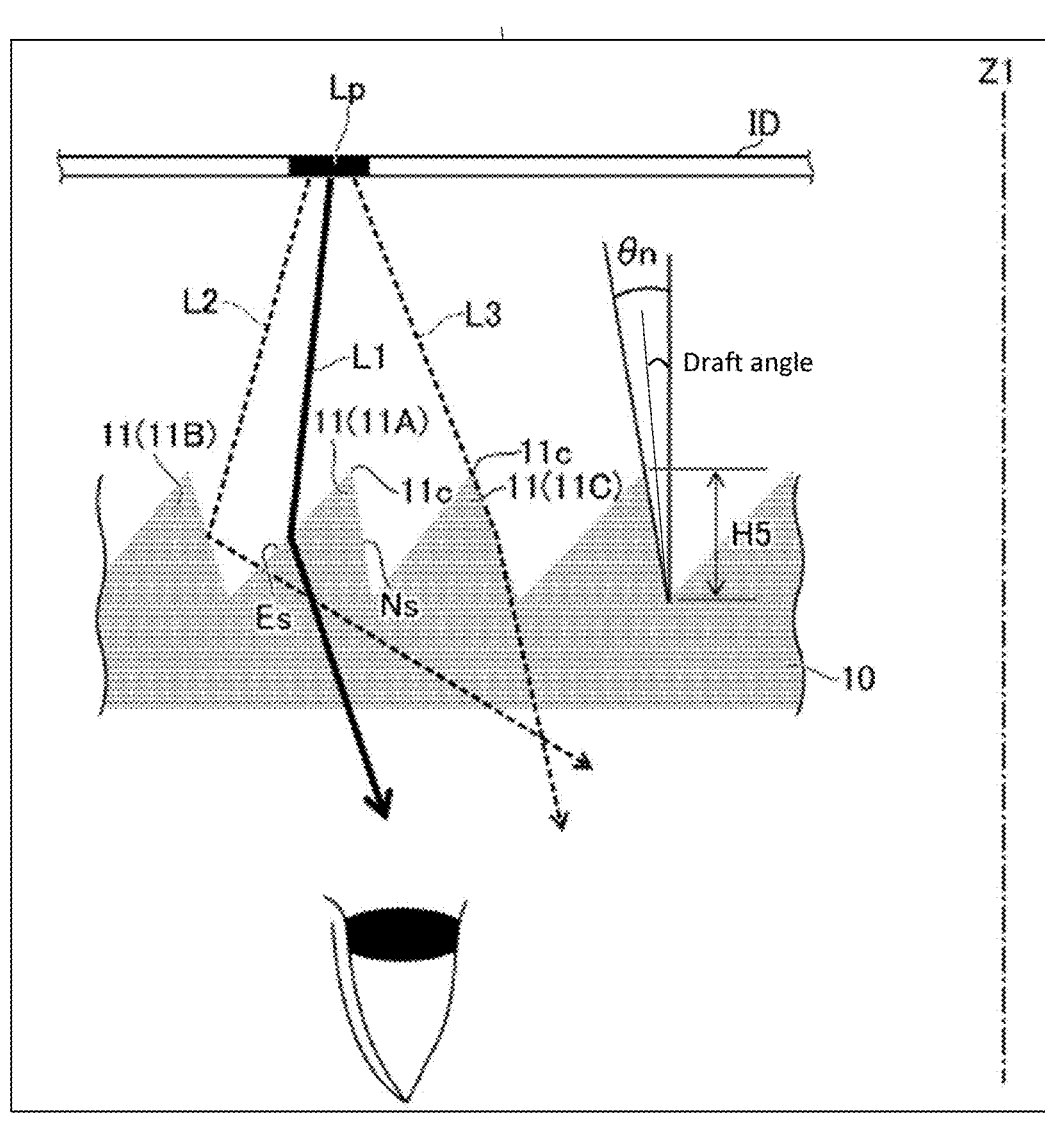
FIG. 2A is an enlarged cross-sectional view of a Fresnel lens proposed in the present disclosure.

A Fresnel lens proposed in the present disclosure will be described hereinbelow. In the present description, a Fresnel lens 10 illustrated in FIG. 1, etc. will be described below as an example of the Fresnel lens proposed in the present disclosure.

Figure 6:
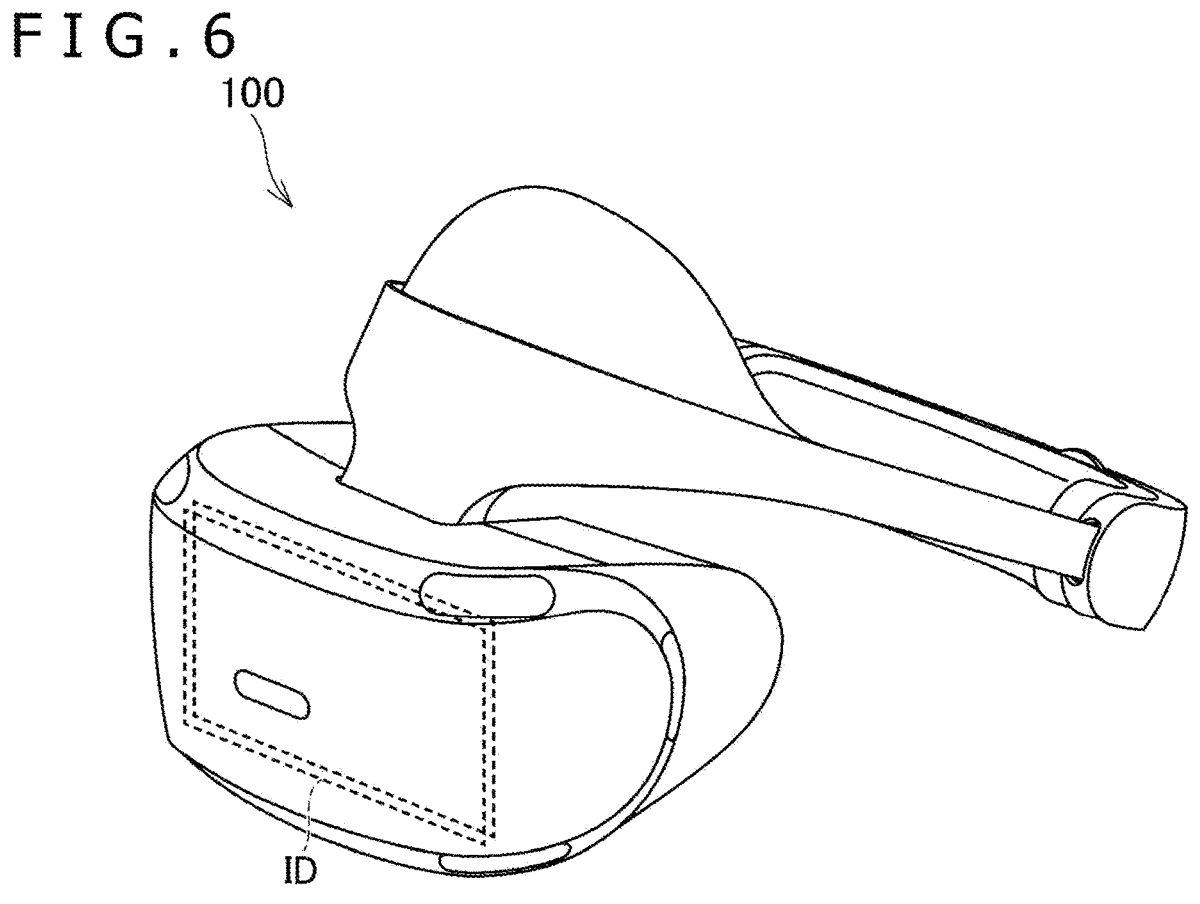

The Fresnel lens 10 is mounted in an image observing device having a display device. For example, the Fresnel lens 10 is used as an eyepiece optical system in a head-mounted display 100 (see FIG. 6). The head-mounted display 100 has a display device ID to be placed in front of the eyes of a user (observer). The display device ID is, for example, a liquid crystal display device, an organic electroluminescence (EL) display device, a micro light emitting diode (LED) display device, or the like. In a case where the Fresnel lens 10 is mounted in the head-mounted display 100, two Fresnel lenses 10 are juxtaposed in left and right positions. The head-mounted display 100 may include, in addition to the Fresnel lenses 10, other Fresnel lenses positioned along an optical axis Z1 with respect to the Fresnel lenses 10. The image observing device that incorporates the Fresnel lenses 10 is not limited to the head-mounted display 100 and may be applied to an electronic viewfinder for cameras, for example.

As illustrated in FIG. 1, a plurality of prisms 11 are disposed on a plane transverse to the optical axis Z1, e.g., a plane, a concave plane, a convex plane, or the like perpendicular to the optical axis Z1. In FIG. 1, the Fresnel lens 10 is disposed such that the prisms 11 protrude toward the display device ID. However, unlike the configuration illustrated in FIG. 1, the Fresnel lens 10 may be disposed such that the prisms 11 protrude toward the pupils of the observer.

When the Fresnel lens 10 is viewed in a direction along the optical axis Z1, each of the prisms 11 is of an annular shape around the optical axis Z1. The prisms 11 are arrayed in radial directions, i.e., directions perpendicular to the optical axis Z1, when the Fresnel lens 10 is viewed in the direction along the optical axis Z1. Each of the prisms 11 has an effective surface Es and a noneffective surface Ns. Further, each of the prisms 11 has a crest 11c between the effective surface Es and the noneffective surface Ns. The effective surface Es faces an outer circumference of the Fresnel lens 10 and is inclined to the optical axis Z1. Specifically, the effective surface Es is inclined such that a distance from the optical axis Z1 to a line De normal to the effective surface Es is progressively larger toward a front side of the Fresnel lens 10, i.e., toward the display device ID in FIG. 1. The effective surfaces Es correspond to a plurality of divided annular sections of a lens surface of a convex lens having optical performance required in the image observing device. The divided lens surface sections are disposed on a plane transverse to the optical axis Z1, e.g., a plane, a concave plane, a convex plane, or the like perpendicular to the optical axis Z1, making up the Fresnel lens 10. The noneffective surfaces Ns face the optical axis Z1. Specifically, lines Dn normal to the noneffective surfaces Ns extend toward the optical axis Z1.

FIG. 2A is a cross-sectional view of a Fresnel lens 10 proposed in the present disclosure. As illustrated in FIG. 2A, the noneffective surface Ns of each prism 11 has an inclined surface inclined to the optical axis Z1. The noneffective surface Ns is inclined such that a distance from the optical axis Z1 to the noneffective surface Ns is progressively larger toward the crest 11c. (The distance between the noneffective surface Ns and the optical axis Z1 refers to a distance in a direction perpendicular to the optical axis Z1.) This inclination of the noneffective surface Ns can restrain flare from occurring. Preferably, the noneffective surfaces Ns of all the prisms 11 should have inclined surfaces, though the noneffective surfaces Ns of only some of the prisms 11 may have inclined surfaces.

Figure 2B:
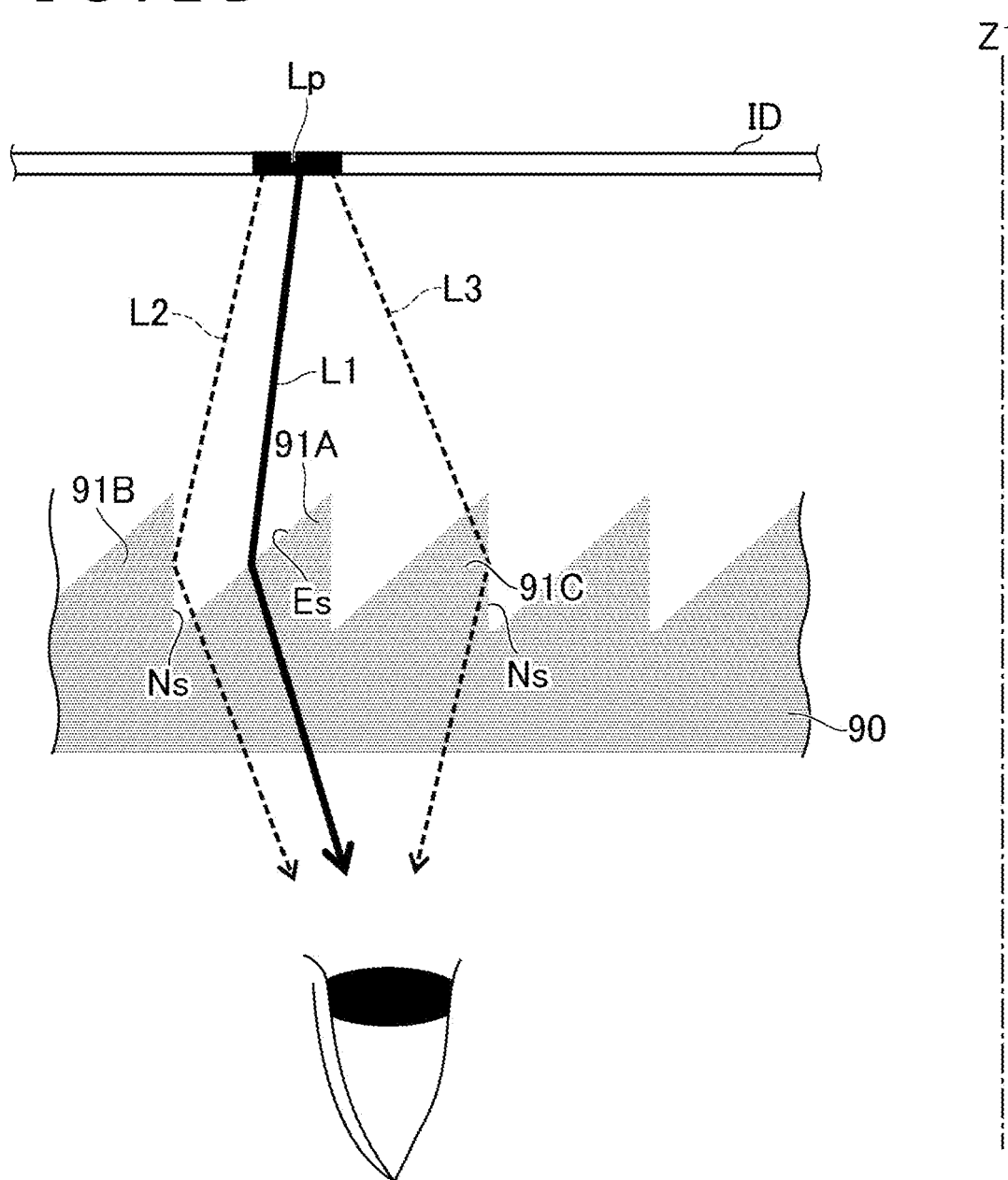
FIG. 2B is a view illustrative of a mechanism for producing flare due to noneffective surfaces.

FIG. 2B is a view illustrative of a mechanism for producing flare due to noneffective surfaces. In FIG. 2B, there is illustrated a Fresnel lens 90 having noneffective surfaces Ns lying parallel to the optical axis Z1, unlike the Fresnel lens 10. When the observer views a light emission spot Lp on the display device ID, light L1 emitted from the light emission spot Lp is refracted by the effective surface Es of a prism 91A and lands at the pupil of the observer. The light emission spot Lp also emits light that reaches noneffective surfaces Ns, in addition to the light L1. In the illustrated example, light L2 is reflected by the noneffective surface Ns of a prism 91B disposed outwardly of the prism 91A and lands at the pupil of the observer.

Further, light L3 is incident on a prism 91C disposed inwardly of the prism 91A from the effective surface Es of the prism 91C, is reflected by the noneffective surface Ns, and lands at the pupil of the observer. When the observer thus views the light emission point Lp on the display device ID, not only the light L1 is refracted by the effective surface Es and lands at the pupil of the observer, but the light L2 and L3 are generated which are reflected by the noneffective surfaces Ns and land at the pupil of the observer. The light L2 and L3 produce flare. Hereinafter, light directed toward the noneffective surface Ns, represented by the light L2 and L3, will be referred to as "noneffective light," whereas light incident on the effective surface Es, represented by the light L1, will be referred to as "effective light."

As illustrated in FIG. 2A, also in the Fresnel lens 10, when the observer views the light emission spot Lp on the display device ID, the effective light L1 emitted from the light emission spot Lp is refracted by the effective surface Es of a prism 11A and lands at the pupil of the observer. The light emission spot Lp also emits the noneffective light L2 and L3 described above. (Directions in which the noneffective light L2 and L3 are emitted from the light emission spot Lp as illustrated in FIG. 2A and directions in which the noneffective light L2 and L3 are emitted from the light emission spot Lp as illustrated in FIG. 2B are the same as each other.) However, the noneffective surface Ns is inclined to the optical axis Z1 by an angle θn assured between the noneffective surface Ns and the optical axis Z1 in the Fresnel lens 10. Therefore, the noneffective light L2 deviates from the position of the pupil of the observer though it is totally reflected by the noneffective surface Ns of a prism 11B disposed outwardly of the prism 11A. Further, since the noneffective surface Ns is inclined to the optical axis Z1, the noneffective light L3 also deviates from the position of the pupil of the observer. Stated otherwise, the angle θn is designed at each prism 11 to cause the noneffective light L2 and L3 to deviate from the position of the pupil of the observer. Consequently, flare is restrained from occurring.

The angle θn between the noneffective surface Ns and the optical axis Z1 is larger than a draft angle. The "draft angle" refers to a tapered surface of a mold used to mold the Fresnel lens 10 for allowing the mold and the molded product, i.e., the Fresnel lens 10, to be separated smoothly from each other. The tapered surface is inclined to a direction in which the mold and the molded product are separated from each other. The draft angle ranges from 1 degree to 5 degrees, for example. On the other hand, the angle θn between the noneffective surface Ns and the optical axis Z1 is larger than 5 degrees, for example. Preferably, the angle θn should be larger than 15 degrees. More preferably, the angle θn should be larger than 20 degrees. The angle θn should much more preferably be larger than 30 degrees. The angle θn is smaller than 40 degrees. Preferably, the angle θn should be smaller than 35 degrees.

The angle θn of the noneffective surface Ns may vary depending on the distance from the optical axis Z1 to the prism 11. The variable angle θn is more effective to prevent the noneffective light L2 and L3 from reaching the pupil of the observer. Depending on an angle of the effective surface Es, i.e., optical characteristics of the Fresnel lens 10, the angle θn may increase as the distance from the optical axis Z1 to the prism 11 increases. Conversely, depending on the angle of the effective surface Es, the angle θn may decrease as the distance from the optical axis Z1 to the prism 11 increases.

Figure 4:
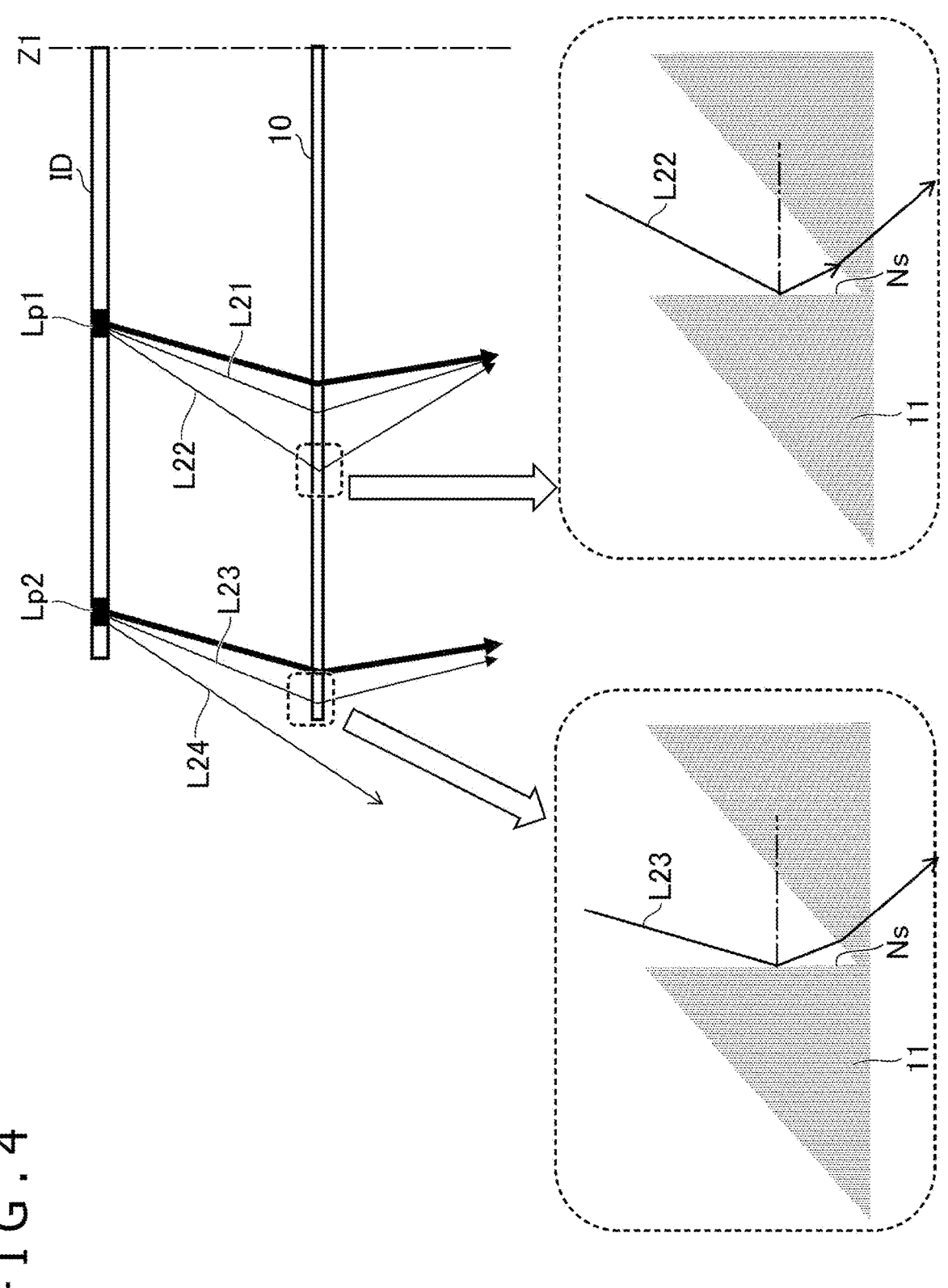
FIG. 4 is a view illustrative of the relation between the distance from an optical axis to a prism and the angle of a noneffective surface.

FIGS. 3 and 4 are views illustrative of a relation between the distance from the optical axis Z1 to a prism and the angle θn.

FIG. 3 illustrates in (a) a prism 91 close to the optical axis Z1, i.e., a prism whose noneffective surface Ns is not inclined, and FIG. 3 illustrates in (b) a prism 91 whose distance from the optical axis Z1 is relatively large. As described above, the effective surfaces Es of the Fresnel lens correspond to divided sections of the lens surface of a convex lens. Therefore, as illustrated in FIG. 3 in (a), at a position close to the optical axis Z1, a gradient of the effective surface Es is relatively gradual, and as illustrated in FIG. 3 in (b), at a position remote from the optical axis Z1, the gradient of the effective surface Es is relatively steep. Therefore, an angle θe1 or θe2 of incidence of the noneffective light L3 to the noneffective surface Ns is smaller on the prism 91 remote from the optical axis Z1 (FIG. 3 in (b)) than on the prism 91 close to the optical axis Z1 (FIG. 3 in (a)). (In other words, the angle θe2 of incidence of the noneffective light L3 illustrated in FIG. 3 in (b) is smaller than the angle θe1 of incidence of the noneffective light L3 illustrated in FIG. 3 in (a)). Consequently, at a position close to the optical axis Z1, it is possible to prevent the noneffective light L3 from reaching the noneffective surface Ns even though the angle θn between the noneffective surface Ns and the direction of the optical axis Z1 is relatively small. Inasmuch as the angle θe1 or θe2 of incidence of the noneffective light L3 to the noneffective surface Ns is thus different depending on the distance from the optical axis Z1, the angle θn of the noneffective surface Ns should desirably be varied depending on the distance from the optical axis Z1.

FIG. 4 illustrates noneffective light L21, L22, L23, and L24 emitted from light emission spots Lp1 and Lp2. The noneffective light L21 and L22 emitted from the light emission spot Lp1 close to the optical axis Z1 reach the Fresnel lens 10. On the other hand, a portion of the noneffective light, i.e., the light L24, emitted from the light emission spot Lp2 remote from the optical axis Z1 passes outside of the Fresnel lens 10. Therefore, the noneffective light L2 (see FIG. 2A) is less likely to land at the pupil of the observer closer to an outer circumferential portion of the Fresnel lens 10. In the outer circumferential portion of the Fresnel lens 10, consequently, it is possible to prevent the noneffective light L2 (see FIG. 2A) from landing at the pupil of the observer even though the angle θn between the noneffective surface Ns and the direction along the optical axis Z1 is small. In the outer circumferential portion of the Fresnel lens 10, therefore, the angle θn of the noneffective surface Ns may be relatively small.

FIG. 5A is a cross-sectional view illustrating at an enlarged scale the crest 11c of a prism 11. As illustrated in FIG. 5A, the prism 11 has a curved surface Cs on the crest 11c. The curved surface Cs on the crest 11c makes it easy to mold the Fresnel lens 10.

Further, the noneffective surface Ns of the prism 11 includes a first noneffective surface Ns1 relatively remote from the crest 11c and a second noneffective surface Ns2 relatively close to the crest 11c. The first noneffective surface Ns1 and the second noneffective surface Ns2 are juxtaposed in a direction along the optical axis Z1. The angle θn referred to above is assured between the first noneffective surface Ns1 and the direction along the optical axis Z1. The angle θn of the first noneffective surface Ns1 may vary depending on the distance from the optical axis Z1 as described above with reference to FIGS. 3 and 4. An angle between the second noneffective surface Ns2 and the direction along the optical axis Z1 is smaller than the angle θn between the first noneffective surface Ns1 and the direction along the optical axis Z1.

Figure 5B:
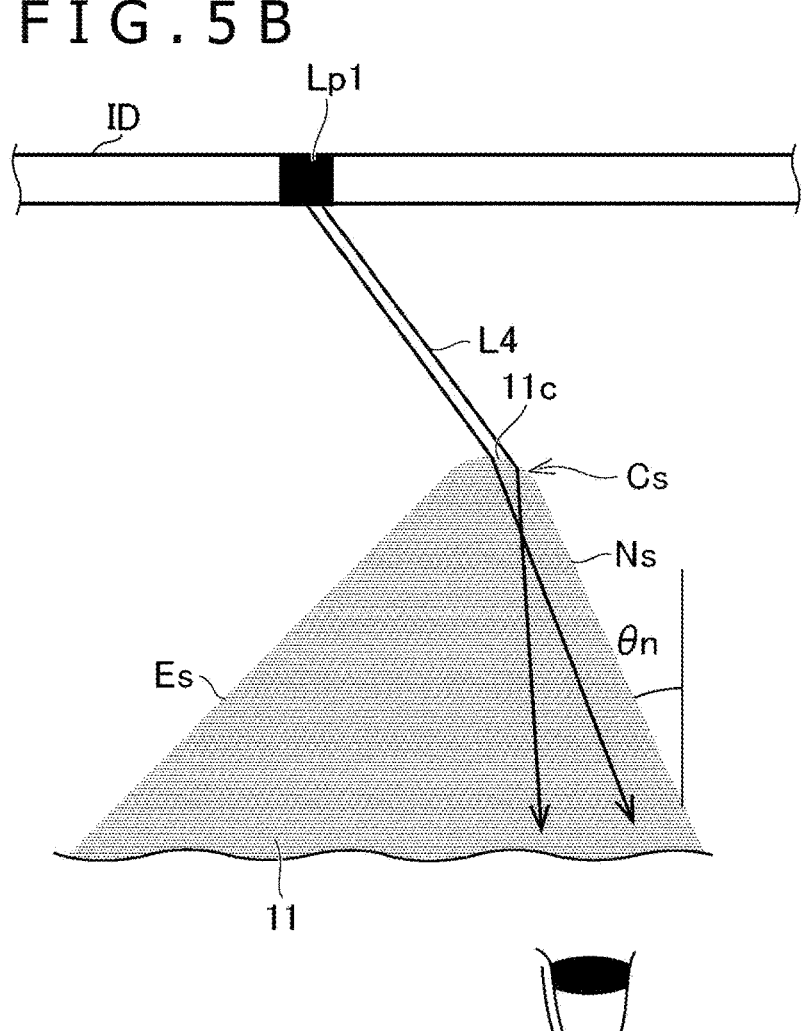
FIG. 5B is a cross-sectional view illustrating at an enlarged scale a crest of a prism free of a second noneffective surface.

As illustrated in FIG. 5A, a portion of light, i.e., light L4 in FIG. 5A, emitted from the light emission spot Lp1 is refracted by the curved surface Cs and incident on the prism 11. The second noneffective surface Ns2 prevents the light L4 from reaching the pupil of the observer. FIG. 5B illustrates a prism 11 that is free of the second noneffective surface Ns2. In FIG. 5B, the position of a light emission spot Lp1 and the direction of light L4 emitted from the light emission spot Lp1 are the same as those illustrated in FIG. 5A. As illustrated in FIG. 5B, in a case where the noneffective surface Ns does not have the second noneffective surface Ns2 and is inclined in its entirety to the optical axis Z1, the light L4 is produced which is refracted by the curved surface Cs and travels along the noneffective surface Ns. If the light L4 reaches the pupil of the observer, it causes flare to occur. On the other hand, as the prism 11 illustrated in FIG. 5A has the second noneffective surface Ns2 included in the noneffective surface Ns, the second noneffective surface Ns2 blocks the light L4 and prevents the light L4 from reaching the pupil of the observer.

With the prism 11 illustrated in FIG. 5A, it is also possible to block light L5 that is emitted from the light emission spot Lp2 and reflected by an outer surface of the noneffective surface Ns2, by use of the first noneffective surface Ns1, and to prevent the light L5 from reaching the pupil of the observer.

The second noneffective surface Ns2 lies parallel to the optical axis Z1, for example. The second noneffective surface Ns2 may be inclined to the optical axis Z1. In the latter case, the angle between the second noneffective surface Ns2 and the optical axis Z1 may be the same as the draft angle referred to above or may be larger than the draft angle.

As illustrated in FIG. 5A, a distance H4 (a distance in a direction along the optical axis Z1) from the crest 11c of the prism 11, i.e., an uppermost end of the prism 11, to a boundary M between the second noneffective surface Ns2 and the first noneffective surface Ns1 is larger than a diameter of the curved surface Cs. By thus designing the distance H4, or stated otherwise, by thus designing a size of the second noneffective surface Ns2, the second noneffective surface Ns2 can effectively function on the light refracted by the curved surface Cs. In the present description, the "diameter of the curved surface Cs" refers to a diameter of a hypothetical circle R (see FIG. 5A) inscribing the curved surface Cs. The circle R refers to a circle having the largest diameter among hypothetical circles inscribing the curved surface Cs. The diameter of the curved surface Cs is in a range from 3 to 20 μm, for example. Therefore, in a case where the diameter of the curved surface Cs is larger than 3 μm, the distance H4 from the crest 11c to the boundary M between the second noneffective surface Ns2 and the first noneffective surface Ns1 is larger than 3 μm, for example.

Moreover, the distance H4 from the crest 11c of the prism 11 to the boundary M between the second noneffective surface Ns2 and the first noneffective surface Ns1 is smaller than half a height H5 (see FIG. 2A) of the prism 11. By thus designing the height H4, a size of the first noneffective surface Ns1 is assured. As a result, the noneffective light L2 and L3 (see FIG. 3) are prevented from landing at the pupil of the observer. In the present description, the height H5 of the prism 11 refers to a distance (a distance in the direction along the optical axis Z1) from a boundary B (see FIG. 2A) between the noneffective surface Ns and the effective surface Es of two adjacent prisms 11 to the crest 11c.

As described above, each of the prisms 11 has the effective surface Es facing outwardly of the Fresnel lens 10 and inclined to the optical axis Z1 and the noneffective surface Ns facing the optical axis Z1, and the crest 11c between the effective surface Es and the noneffective surface Ns. In each of the prisms 11, the noneffective surface Ns has the first noneffective surface Ns1 and the second noneffective surface Ns2 that is closer to the crest 11c of the prism 11 than the first noneffective surface Ns1. The first noneffective surface is inclined to the optical axis Z1. This structure is able to restrain the noneffective light L2 and L3 from reaching the pupil of the observer and from causing flare to occur.

The Fresnel lens proposed in the present disclosure is not limited to the above examples of the Fresnel lens 10.

For example, the angle between the second noneffective surface Ns2 and the direction along the optical axis Z1 may be the same as the angle between the first noneffective surface Ns1 and the direction along the optical axis Z1. In other words, the noneffective surface Ns may be a flat surface.

According to another example, the noneffective surface Ns may not be bent at the boundary M between the first noneffective surface Ns1 and the second noneffective surface Ns2. In other words, the noneffective surface Ns may be curved in its entirety, making the first noneffective surface Ns1 and the second noneffective surface Ns2 blend smoothly into each other.

According to still another example, the noneffective surface Ns may have, in addition to the first noneffective surface Ns1 and the second noneffective surface Ns2, a third noneffective surface and a fourth noneffective surface that have different angles from those of the first noneffective surface Ns1 and the second noneffective surface Ns2.

The invention claimed is:

1. A Fresnel lens having a plurality of prisms arrayed from an optical axis toward an outer circumference of the lens, wherein each of the plurality of prisms comprises:

an effective surface facing the outer circumference of the Fresnel lens and inclined to the optical axis;

a noneffective surface facing the optical axis;

a crest between the effective surface and the noneffective surface; and a curved surface on the crest, wherein the noneffective surface and the effective surface of two adjacent prisms of the plurality of prisms extend from a first boundary between the effective surface and the noneffective surface of the two adjacent prisms to the crest, wherein the noneffective surface of at least one of the plurality of prisms comprises a first surface and a second surface closer to the crest relative to the first surface, the first surface and the second surface are configured to be at different angles relative to the optical axis, wherein the second surface extends from the crest of the prism to the first surface and at least the first surface being inclined to the optical axis, wherein the curved surface is configured to refract a light incident on the prism at the curved surface, wherein the first surface and the second surface are configured to refract a first portion and a second portion of the refracted light, respectively, at the different angles relative to the optical axis, and wherein a distance from the crest to a second boundary between the second surface and the first surface is larger than a diameter of the curved surface.

2. The Fresnel lens according to claim 1, wherein, in the at least one of the plurality of prisms, an angle between the second surface and the optical axis is smaller than an angle between the first surface and the optical axis.

3. The Fresnel lens according to claim 1, wherein a distance from the crest to the second boundary between the second surface and the first surface is smaller than half a height of the prisms.

4. The Fresnel lens according to claim 1, wherein an angle between the first surface and the optical axis varies depending on a distance of the first surface from the optical axis.

5. The Fresnel lens according to claim 1, wherein an angle between the first surface and the optical axis is larger than a draft angle of the Fresnel lens.

6. The Fresnel lens according to claim 1, wherein an angle between the first surface and the optical axis is larger than 5 degrees and equal to or smaller than 40 degrees.

7. An image observing device comprising:

a Fresnel lens having a plurality of prisms arrayed from an optical axis toward an outer circumference of the lens, each of the plurality of prisms comprising:

an effective surface facing the outer circumference of the Fresnel lens and inclined to the optical axis;

a noneffective surface facing the optical axis;

a crest between the effective surface and the noneffective surface; and a curved surface on the crest, wherein the noneffective surface and the effective surface of two adjacent prisms of the plurality of prisms extend from a first boundary between the effective surface and the noneffective surface of two adjacent prisms to the crest, wherein the noneffective surface of at least one of the plurality of prisms comprises a first surface and a second surface closer to the crest relative to the first surface, the first surface and the second surface are configured to be at different angles relative to the optical axis, wherein the second surface extends from the crest of the prism to the first surface and at least the first surface being inclined to the optical axis, wherein the curved surface is configured to refract a light incident on the prism at the curved surface, wherein the first surface and the second surface are configured to refract a first portion and a second portion of the refracted light, respectively, at the different angles relative to the optical axis, and wherein a distance from the crest to a second boundary between the second surface and the first surface is larger than a diameter of the curved surface; and a display.

8. The image observing device according to claim 7, wherein, in the at least one of the plurality of prisms, an angle between the second surface and the optical axis is smaller than an angle between the first surface and the optical axis.

9. The image observing device according to claim 7, wherein a distance from the crest to the second boundary between the second surface and the first surface is smaller than half a height of the prisms.

10. The image observing device according to claim 7, wherein an angle between the first surface and the optical axis varies depending on a distance of the first surface from the optical axis.

11. The image observing device according to claim 7, wherein an angle between the first surface and the optical axis is larger than a draft angle of the Fresnel lens.

12. The Fresnel lens according to claim 7, wherein an angle between the first surface and the optical axis is larger than 5 degrees and equal to or smaller than 40 degrees.

13. A Fresnel lens, comprising:

a plurality of prisms arrayed from an optical axis toward an outer circumference of the lens, wherein each of the plurality of prisms comprises:

an effective surface facing the outer circumference of the Fresnel lens and inclined to the optical axis;

a noneffective surface facing the optical axis;

a crest between the effective surface and the noneffective surface; and a curved surface on the crest, wherein the noneffective surface and the effective surface of two adjacent prisms of the plurality of prisms extend from a boundary between the effective surface and the noneffective surface of the two adjacent prisms to the crest, wherein the noneffective surface of at least one of the plurality of prisms comprises a first surface and a second surface closer to the crest relative to the first surface, the first surface and the second surface are configured to be at different angles relative to the optical axis, wherein the second surface extends from the crest of the prism to the first surface and at least the first surface being inclined to the optical axis, wherein the curved surface is configured to refract a light incident on the prism at the curved surface, wherein the first surface and the second surface are configured to refract a first portion and a second portion of the refracted light, respectively, at the different angles relative to the optical axis, and wherein an angle between the first surface and the optical axis is between 30 degrees and 35 degrees, inclusive.

14. A device comprising:

a Fresnel lens including a plurality of prisms arrayed from an optical axis toward an outer circumference of the lens, each of the plurality of prisms comprising:

an effective surface facing the outer circumference of the Fresnel lens and inclined to the optical axis;

a noneffective surface facing the optical axis;

a crest between the effective surface and the noneffective surface; and a curved surface on the crest, wherein the noneffective surface and the effective surface of two adjacent prisms of the plurality of prisms extend from a boundary between the effective surface and the noneffective surface of the two adjacent prisms to the crest, wherein the noneffective surface of at least one of the plurality of prisms comprises a first surface and a second surface closer to the crest relative to the first surface, the first surface and the second surface are configured to be at different angles relative to the optical axis, wherein the second surface extends from the crest of the prism to the first surface and at least the first surface being inclined to the optical axis, wherein the curved surface is configured to refract a light incident on the prism at the curved surface, wherein an first surface and the second surface are configured to refract a first portion and a second portion of the refracted light, respectively, at the different angles relative to the optical axis, and wherein the angle between the first surface and the optical axis is between 30 degrees and 35 degrees, inclusive.

15. The Fresnel lens according to claim 1, wherein an angle between the second surface and the optical axis is equal to or greater than a draft angle of the Fresnel lens.

16. The Fresnel lens of claim 3, wherein the height of the prisms is a distance from the first boundary to the crest.

17. The image observing device of claim 9, wherein the height of the prisms is a distance from the first boundary to the crest.

* * * * *